Figure 1:
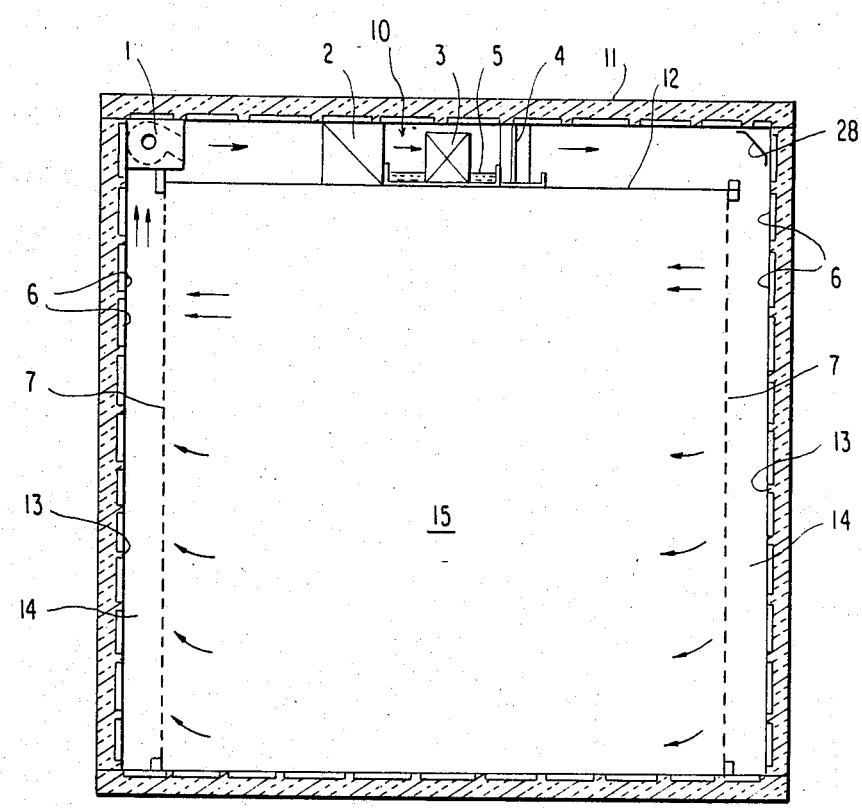

United States Patent [19]

Berrens

[11] Patent Number: 4,579,051
[45] Date of Patent: Apr. 1, 1986

[54] APPLIANCE FOR BREAD AND SIMILAR FOODSTUFFS

[76] Inventor: Wolfgang Berrens, Rebhuhnweg 17, D-4156 Willich, Fed. Rep. of Germany

[21] Appl. No.: 484,661

[22] Filed: Apr. 13, 1983

[51] Int. Cl.⁴ .................... A23L 1/00; A21C 13/00
[52] U.S. Cl. ............................... 99/468; 99/475; 99/483
[58] Field of Search ............ 99/331, 332, 447, 467, 99/468, 473, 474, 483, 486; 426/418, 419, 465, 506, 523; 219/362, 386, 400, 401, 408; 312/31, 236, 237; 126/348, 369, 20, 21 A

[56] References Cited
U.S. PATENT DOCUMENTS
3,424,231 1/1969 Truhan .
4,426,923 1/1984 Ohata ................................. 99/468

Primary Examiner—Timothy F. Simone
Attorney, Agent, or Firm—Beveridge, DeGrandi & Weilacher

[57] ABSTRACT

A keep-fresh appliance for bread and similar food-stuffs is described. The appliance consists of a receptacle and of a conditioning device (10) arranged in this and intended for the gas mixture located in the receptacle, in order to provide this gas mixture with an increased temperature and increased relative humidity in relation to ambient conditions. To achieve a horizontal air conveyance in the receptacle and to prevent the formation of condensate on the product, the devices located in the receptacle and the walls of the receptacle, the air stream is blown through perforated walls (7) located in the receptacle, and the walls of the receptacle are heated. To remove the heat lost from the ventilator and the heat radiated from the walls of the receptacle, the air stream is conveyed over a heat exchanger (2).

9 Claims, 2 Drawing Figures

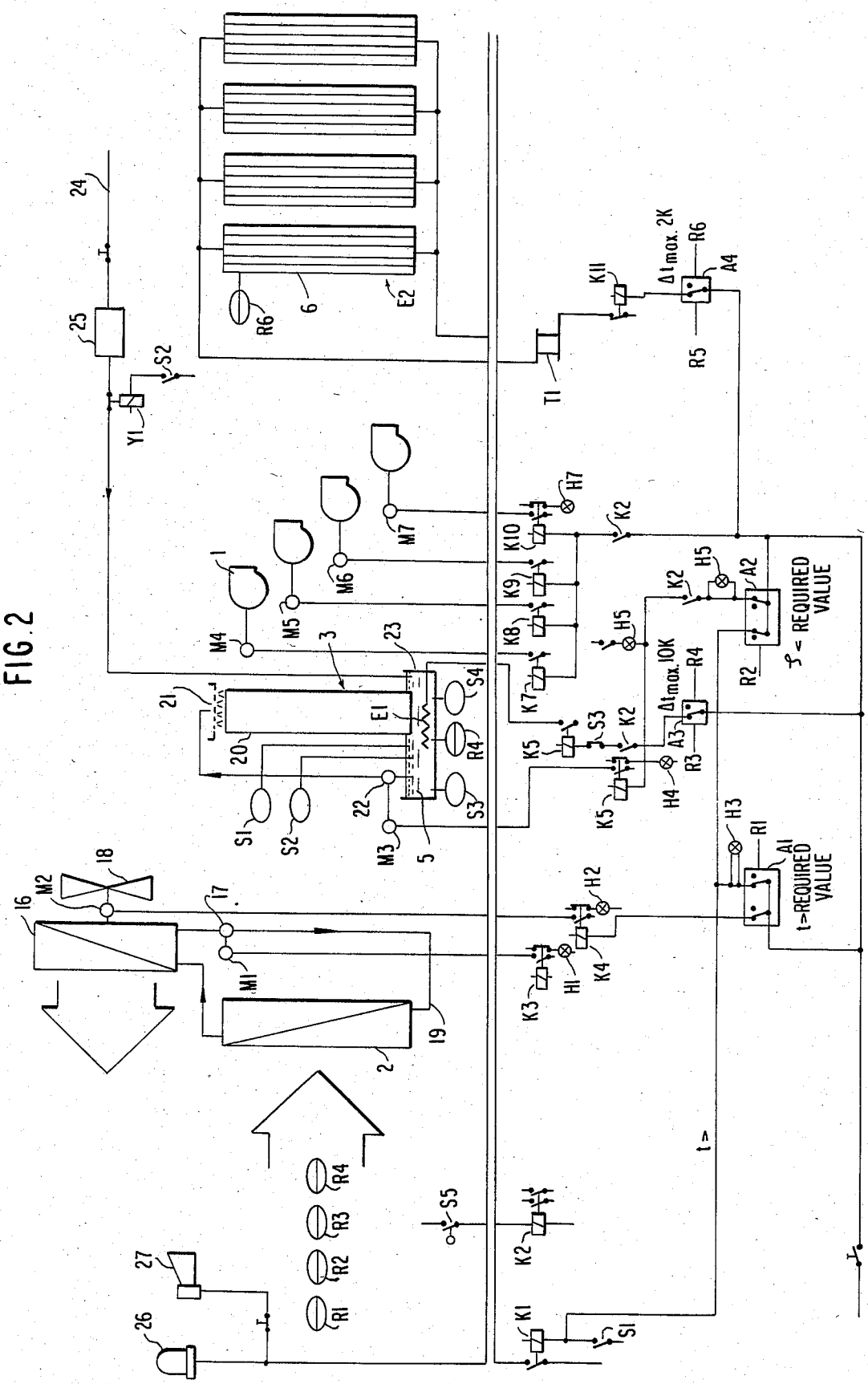

APPLIANCE FOR BREAD AND SIMILAR FOODSTUFFS

The invention relates to a keep-fresh appliance for bread and similar foodstuffs with a receptacle for storing bread, which receptacle is insulated from the surrounding atmosphere, and with a device located in the latter for conditioning the gas mixture (air) located in the receptacle, in order to provide this gas mixture with an increased relative humidity and increased temperature in relation to customary ambient conditions, the appliance incorporating a fan for generating a circulating gas stream, a device for bringing the gas stream into contact with an aqueous solution of a salt, which device has a contact body through which the gas stream flows approximately horizontally and which works on the evaporation principle, a spraying device assigned to this and a container for collecting the solution which has flowed through the contact body, and a heating device for the gas stream.

An appliance of the type mentioned above is known from German Offenlegungsschrift No. 2,940,242. In the known appliance, the air stream emitted by a fan is blown over a heating device, for example an infrared heating device, before it reaches the contact body. So that the temperature of the circulating air stream can be regulated, a temperature measuring sensor is arranged so that it is in contact with the heated and humidified air stream leaving the contact device. This measuring sensor supplies appropriate signals to a controller which controls the operation of the heating device. There is no special humidity controller; the humidity content of the circulating air stream is regulated solely by means of the adjustment of the concentration of the salt solution used. The concentration of the salt solution is kept constant via a float circuit with an upper and lower limit switch in the supply container of the salt solution by means of an appropriate fresh water supply.

In the known keep-fresh appliance, the air-conditioning device is attached to the ceiling of the receptacle. There are no special directing or guide devices for the circulated air stream.

However, when the known appliance is in operation, it has been found that, despite the use of the abovementioned control or regulating devices for adjusting and maintaining a specific state of air-conditioning (temperature/humidity) in the receptacle, temperature and/or humidity gradients can arise within the receptacle. Thus, in particular, the formation of condensate was observed on the products to be stored and on the insides of the walls of the receptacle. It was also noted that the air stream becomes increasingly warmer despite the fact that the heating device was switched off, this being attributable essentially to the heat loss from the fan. The adverse effects of the abovementioned formation of condensate are, in addition to direct damage to the products to be stored, also the fact that it promotes the formation of mold, and this is to be reduced precisely by the keep-fresh appliance concerned here.

The object on which the invention is based is to provide a keep-fresh appliance of the type mentioned, by means of which, whilst preventing temperatures from falling below the dew point, substantially uniform and constant temperature and humidity conditions can be produced and maintained within the receptacle.

This object is achieved, according to the invention, in a keep-fresh appliance of the type described in the introduction, due to the fact that located in the receptacle, adjacent to its side walls, are perforated walls which form between them a storage space for the products to be kept fresh and which, together with the associated side walls of the receptacle, limit gas-conveying channels, that the fan incorporates at least one cross-flow ventilator which is capable of generating an essentially horizontal gas conveyance starting from the gas-conveying channel and passing through the storage space, that the heating device incorporates devices for heating the inside of the walls of the receptacle, and that the circulating gas stream is conveyed over at least one heat exchanger.

In contrast to the appliance known from German Offenlegungsschrift No. 2,940,242, in the appliance designed according to the invention a heating device does not necessarily have to be provided in the circulating gas stream. Instead, in the appliance according to the invention, the insides of the walls of the receptacle are heated, resulting in the advantage that conditions falling below the dew point during contact with the gas stream, and consequently the formation of condensate, cannot occur here. The insides are thus brought to a temperature which is above that of the circulating gas stream. The circulating gas stream is heated sufficiently (for example 30° to 50° C.) by the radiant heat emitted from the insides of the receptacle and the heat loss from the ventilator, so that there is, as a rule, no need for a special heating device located in the air stream. On the contrary, it even happens that the gas stream is heated increasingly as the result of the two factors mentioned above and even exceeds the desired temperature range. To prevent this, the gas stream is conveyed, in a manner according to the invention, via at least one heat exchanger which causes appropriate cooling of the gas stream. Appropriate control and regulating devices are, of course, provided, so that the desired temperature range of the gas stream can be adjusted and maintained by switching the individual components on or off. These devices will be discussed in detail later.

It goes without saying that energy can be saved by making use of the heat loss from the ventilator and the radiant heat emitted from the walls of the receptacle, which must in any case be heated to prevent formation condensate, to heat the circulating gas stream.

To avoid within the receptacle temperature and humidity gradients which can, in particular, also result in the formation of condensate on the product to be kept fresh, intensive an uniform gas circulation over the chamber cross-section is necessary. It has been shown, here, that an approximately horizontal gas conveyance gives the best results as regards keeping the products fresh. Uniform gas circulation is achieved by the use of cross-current ventilators in conjunction with the provision of perforated walls which are arranged adjacent to the side walls of the receptacle and which, together with these, limit appropriate gas-conveying channels. The storage space located between the perforated walls for the products to be kept fresh can thereby receive an approximately horizontal flow at all cross-sectional heights, and by an appropriate variation in the free cross-section of the perforated walls over their height (when the conditioning device is located on the ceiling of the receptacle, the free cross-section of the perforated walls is less at the bottom than at the top on the blowing-in side and vice versa on the blowing-out side) an approximately identical gas velocity can also be achieved. This makes it possible to keep the temperature and the humidity content of the gas stream in the region of the storage space on the whole uniform and constant.

It goes without saying that as a result of the measures indicated above it is possible to avoid effectively the formation of condensate not only on the product and the inside of the walls of the receptacle, but also on the fittings within the receptacle (perforated walls, storage frames for the products, conditioning device, etc.).

As additional prior art, German Patent Specification No. 289,195 which likewise describes a keep-fresh appliance for bread may also be mentioned in this respect. In this known appliance also, a humidified air stream is circulated and at the same time conveyed over the products to be kept fresh. However, as FIG. 2 of the publication shows, the air is conveyed in a vertical direction, the air being blown from below against the products to be kept fresh. This does not correspond to the procedure according to the invention.

To guarantee proper operation of the appliance according to the invention, it has a temperature controller, which is controlled by a temperature sensor located in the circulating gas stream, and a humidity controller which is controlled by a humidity sensor located in the circulating gas stream. At the same time, the temperature controller controls the operation of the heat exchanger, as will be explained in detail later. In general, when the heat exchanger is switched on, a flow medium which cools the gas stream and thus lowers its temperature is circulated. The humidity controller controls a pump assigned to the spraying device for the contact body. If, for example, the humidity content of the gas stream is to be increased, the pump is switched on and causes the salt solution to circulate across the contact body through which the gas stream flows approximately horizontally.

It goes without saying that the appliance designed according to the invention also ensures that the concentration of the salt solution is kept constant by providing a supply container of the salt solution with a float circuit, so that when the liquid level falls below a lower limiting value fresh water is supplied and consequently the increase in concentration caused as a result of evaporation from the solution is cancelled again. An appliance of this type is described in German Offenlegungsschrift No. 2,940,242 mentioned.

As already mentioned in the said German Offenlegungsschrift No. 2,940,242, as a result of the air humidification carried out by means of a salt solution, substantial sterilization is achieved at the same time if an appropriate salt solution (for example lithium chloride) is used in an appropriate concentration. It has been shown, however, that those solution concentrations which give very high humidity values (around 95%) best for keeping fresh do no longer guarantee sufficient sterilization because the concentrations are too low. To improve sterilization, therefore, it becomes necessary to have a higher solution concentration. However, at normal temperature this higher concentration does not result in the desired humidity value, with the result that heating of the solution is necessary. The invention makes use of this knowledge. Located in the container for the salt solution is a heating element which can be controlled in such a way that it maintains a solution temperature which is a predetermined maximum value above the temperature of the circulating gas stream. If, for example, a humidity value of 95% is to be obtained by using a 30% salt solution guaranteeing sufficient sterilization, the solution temperature is maintained approximately 10° C. higher than the temperature of the circulated gas stream. This is achieved in control terms by assigning a temperature sensor to the salt solution and to the circulating gas stream, and these control a differential controller which controls the operation of the heating element located in the container.

As already mentioned, the walls of the receptacle are heated in such a way that a temperature which is a predetermined maximum value above the temperature of the circulating gas stream is produced on the inside of the walls. This reliably prevents the formation of condensate. Advantageously, this is achieved in terms of construction by designing the wall-heating devices as grid-shaped electrical heaters, in particular resistance heaters, which are integrated in the walls of the receptacle. At the same time, the walls themselves are constructed in a sandwich-like manner from an inner and an outer plate and a plastic foam layer located between these, the grid-shaped heaters being in direct contact with the outer surface of the inner plates. Convection losses are avoided as a result. It has proved expedient to maintain the temperature on the inside of the walls of the receptacle a maximum of 2° C. above the temperature of the circulating gas stream. In control terms, this is achieved by assigning a temperature sensor respectively to the inside of the wall of the receptacle and to the circulating gas stream, and these control a differential controller which controls the operation of the wall-heating devices.

In a special embodiment, the heat exchanger is designed so that it has a first heat exchanger located in the gas stream and a second heat exchanger located outside the receptacle, these being connected to one another via a pipe to form a closed circuit through which a flow medium can be circulated continuously by means of a circulating pump. A ventilator which can be controlled by the temperature controller is assigned to the second heat exchanger. This arrangement functions as follows: as already mentioned, the gas stream is heated increasingly by the heat loss from the ventilator and the heat energy radiated from the walls of the receptacle, so that cooling is necessary when the desired temperature range is exceeded. When the temperature sensor located in the gas stream transmits a cooling signal to the temperature controller, the latter controls the ventilator assigned to the second heat exchanger so that it is activated. As a result, generally cooler outside air is conveyed over the second heat exchanger, which, like the first heat exchanger, can be a conventional finned heat exchanger, with the result that the circulated flow medium (water) is cooled. The flow medium is conveyed by the circulating pump to the first heat exchanger where it comes into heat-exchanging interaction with the heated gas stream. The gas stream is cooled in this way. This embodiment has proved especially favorable. However, other arrangements known to a person skilled in the art can also be used; thus, for example, the second heat exchanger can also work with water-cooling. The circulating pump generally runs continuously, that is to say even when the ventilator assigned to the second heat exchanger is inoperative. It goes without saying that, provided that appropriate changes are made, the device described here can also be used, if appropriate, for heating the gas stream, should this become necessary.

The conditioning device is preferably located on the ceiling of the receptacle. In this case, the cross-flow ventilator or ventilators first convey the gas stream via the heat exchanger and then via the humidifier to which, if appropriate, a drop separator can be assigned. The gas stream is directed horizontally, and the storage space for the products to be kept fresh can be separated from the conditioning device by a suitable partition wall, for example in the form of a suspended ceiling. Suitable guide members are advantageously attached to the corners of the receptacle, in order to deflect the horizontal gas stream in a vertical direction and thus into the gas-conveying channel. In this embodiment, the free cross-section of the perforated walls is less at the bottom that at the top on the blowing-in side and less at the top than at the bottom on the blowing-out side. As a result, an approximately identical gas velocity is ensured in the upper and lower regions of the storage space.

The invention is now explained in detail with reference to an exemplary embodiment in conjunction with the drawing in which:

FIG. 1 shows a vertical section through a keep-fresh appliance designed according to the invention; and FIG. 2 shows a functional diagram of the keep-fresh appliance of FIG. 1.

The keep-fresh appliance shown in section in FIG. 1 consists of a receptacle which is insulated in terms of heat and water vapor from the surrounding atmosphere and which is equipped with a door and an observation window (not shown), and of a conditioning device 10 arranged in the receptacle and intended for the air located in the receptacle, so as to provide this air with an increased temperature and increased relative humidity in relation to ambient conditions. The objective is a temperature range of approximately 30° to 50° C. and a humidity range of approximately 80 to 95%. At these values, particularly bread can be kept fresh over a relatively long period of time.

The conditioning device 10 is arranged on the ceiling 11 of the receptacle and is separated from a storage space 15 in the receptacle for the products to be kept fresh by a wall 12, for example a suspended ceiling. Located adjacent to the side walls 13 of the receptacle are perforated walls 7 which limit the storage space 15 laterally and which, together with the side walls 13 of the receptacle, limit vertical air-conveying channels 14.

The conditioning device 10 incorporates at least one cross-flow ventilator 1 which sucks in air approximately vertically and blows this approximately horizontally through the space located between the wall 12 and the ceiling 11 of the receptacle. The air stream first passes over a heat exchanger 2, by means of which it is cooled if appropriate, after which it is conveyed approximately horizontally via the contact body of a humidifier 3. Here, the air stream absorbs the desired humidity from a salt solution 5 which is circulated across the contact body and which is collected in a container and recirculated. A drop separator 4 is located downstream of the humidifier 3.

The air stream now brought to the desired temperature and humidity is deflected in a vertical direction at the corner of the receptacle via suitable guide devices 28 and at the same time enters the air-conveying channel 14. On the blowing-in side, the perforated walls 7 have a free cross-section which is less at the bottom than at the top, whilst the free cross-section on the blowing-out side is less at the top than at the bottom. This makes it possible to obtain within the storage space 15 at the top and bottom approximately uniform air velocity which should preferably be between 0.2 and 0.3 m/s. A uniform horizontal air flow, by means of which temperature gradients are largely avoided, is obtained in the storage space 15. The air stream emerges again at the other perforated wall and is sucked upwards through the second air-conveying channel by the cross-flow ventilator 1.

To prevent conditions on the walls of the receptacle from falling below the dew point, they are provided with grid-shaped heating devices 6 which maintain the inside of the walls of the receptacle constant at a temperature which is a specific maximum value above the temperature of the circulated air stream. The heat energy radiated from the walls and the heat loss from the ventilator are utilized simultaneously for heating the air stream, so that special heating devices for this can be omitted. Consequently, the heat exchanger 2 mentioned is primarily used for cooling the air stream, should this be necessary.

FIG. 2 shows a functional and circuit diagram of the keep-fresh appliance illustrated in FIG. 1. In the exemplary embodiment illustrated here, the conditioning device has four cross-flow ventilators 1 with motors M4–M7. It may be assumed that the installation is to be operated at a temperature of 30°–50° C. and a relative air humidity of 95%. To adjust this humidity value by means of the concentration of the salt solution 5 used (LiCl), an approximately 5% salt solution would be required. However, a solution with such a low concentration no longer ensures sufficient sterilization, so that a higher concentration (30%) and an increased temperature of the salt solution are adopted for operation. This temperature should be a maximum of 10° C. above the temperature of the circulated air stream. To achieve this, a heating element E1 controlled via a differential controller A3 is provided in the container 23 for the salt solution 5. A temperature sensor R3 in the circulated air stream and a temperature sensor R4 in the salt solution are assigned to the differential controller. The controller compares the difference between the signals supplied by the two sensors and controls the operation of the heating element E1 in a corresponding way.

To keep the concentration of the salt solution constant at the desired value of 30%, the fresh-water supply 24 in which a water softener 25 is provided is controlled via a float circuit (not shown). As a result of the increasing evaporation from the salt solution, its concentration increases and the liquid level in the container 23 drops. When this falls below a lower limiting value, the float circuit actuates the fresh-water supply so that the concentration is thereby reduced again to an upper limiting value.

The humidity content in the air stream is regulated via a humidity controller A2 to which a humidity sensor R2 in the air stream is assigned. When the humidity sensor R2 indicates too low a humidity in the air stream, the controller actuates the sprinkling pump 22 of the humidifier 3, with the result that the salt solution is circulated via the spraying device 21 and the contact body 20. This takes place until the corresponding shortfall is compensated.

The operation of the electrical heating grids 6 for the wall heating is likewise controlled via a differential controller A4 to which are assigned a temperature sensor R5 located in the air stream and a temperature sensor R6 located on the inside of the heated walls of the receptacle. As mentioned, the operation of the heating grids 6 is controlled so that the wall temperature on the inside is a maximum of 2° C. above the temperature of the circulated air stream. In the embodiment illustrated here, the heating grids are operated at low voltage.

The device required for cooling the air stream comprises a heat exchanger 2 located within the receptacle 5 and a heat exchanger 16 (finned heat exchanger) located outside the receptacle, these being connected to one another via a pipeline 19 to form a closed circuit. Water is circulated continuously through the pipeline 19 via a pump 17. Assigned to the second heat exchanger 16 is a ventilator 18 which, when operative, blows outside air across the heat exchanger and in this way cools the water circulated therein. When the cooled water is circulated through the first heat exchanger 2, it cools the air stream passing through the fins.

A temperature controller A1 to which a temperature sensor R1 in the air stream is assigned serves for regulating the temperature of the air stream. When the temperature sensor R1 indicates too high an air temperature, which will generally be the case after a certain operating time of the appliance since the heat loss from the ventilator and the heat radiated from the walls heat up the air stream, the controller A1 switches on the ventilator 18, with the result that the permanently circulated water is cooled. Cooling the air stream to the desired value is thereby achieved.

Four controllers are therefore required for controlling the operation of the appliance, namely the temperature controller A1, the humidity controller A2, the differential controller A3 for the temperature of the salt solution and the differential controller A4 for the temperature of the heating grids. The remaining control elements required (contactors, fault indicators, etc.), which are listed in the following table, will not be discussed in detail. In the exemplary embodiment illustrated here, the installation is provided with acoustic and visual falt indicators 27, 26 which indicate malfunctions to the user in good time.

| Key to the functional and circuit diagram | | |
|---|---|---|
| A 1 | Temperature controller | |
| A 2 | Humidity controller | |
| A 3 | Differential controller | humidification |
| A 4 | Differential controller | wall heating |
| E 1 | Heater | humidifier |
| H 1 | Fault lamp | circulating-pump cooling system |
| H 2 | Fault lamp | ventilator cooling system |
| H 3 | Fault lamp | temperature too high |
| H 4 | Fault lamp | circulating-pump humidifier |
| H 5 | Fault lamp | humidifier heater |
| H 6 | Fault lamp | humidity too low |
| H 7 | Fault lamp | circulating-air ventilators |
| K 1 | Contactor | central alarm |
| K 2 | Contactor | door switch |
| K 3 | Contactor | circulating-pump cooling system |
| K 4 | Contactor | ventilator cooling system |
| K 5 | Contactor | circulating-pump humidifier |
| K 6 | Contactor | humidifier heater |
| K 7-10 | Contactor | circulating-air ventilators |
| K 11 | Contactor | wall heating |
| M 1 | Motor | circulating-pump cooling system |
| M 2 | Motor | ventilator cooling system |
| M 3 | Motor | circulating-pump humidifier |
| M 4-7 | Motors | circulating-air ventilators |
| R 1 | Temperature sensor for temperature controller | |
| R 2 | Humidity sensor for humidity controller | |
| R 3 | Temperature sensor for differential controller A3 | |
| R 4 | Temperature sensor for differential controller A3 | |
| R 5 | Temperature sensor for differential controller A4 | |
| R 6 | Temperature sensor for differential controller A4 | |
| S 1 | Level safety switch | humidifier |
| S 2 | Level switch | humidifier |
| S 3 | Safety thermostat | humidifier |
| S 5 | Door contact switch | |
| T 1 | Transformer | wall heating |
| Y 1 | Solenoid valve | water top-up feed - humidifier |

I claim:

1. A keep-fresh appliance for bread and similar foodstuffs comprising a receptacle for storing bread, which receptacle is insulated in terms of heat and water vapor from the surrounding atmosphere, a device located in said receptacle for conditioning the gas mixture (air) located in said receptacle to provide said gas mixture with an increased relative humidity and temperature in relation to customary ambient conditions, said appliance including a fan for generating a circulating gas stream, a device for bringing the gas stream into contact with a liquid, said device including spraying means and a container for collecting the liquid in which a heating element is disposed, and means for heating the inside of the walls of said receptacle, said receptacle, adjacent to its side walls (13), having perforated walls (7) which form a storage space (15) for the products to be kept fresh and which, together with the associated side walls of said receptacle, define gas-conveying channels (14), and wherein the fan includes at least one cross-flow ventilator (1) which is capable of generating an essentially horizontal gas conveyance beginning from the gas-conveying channel (14) and passing through the storage space (15), the device for bringing the gas stream into contact with the liquid which is a contact body (20) through which the gas stream flows approximately horizontally, said contact body being sprayed by said spraying means (21) with an aqueous solution of a salt, the heating element (E1) disposed in said container (23) for the liquid being adapted to be controlled in such a way that it maintains a solution temperature which is a predetermined maximum value above the temperature of the circulating gas stream, said devices (6) for heating the inside of the walls of said receptacle being adapted to be controlled in such a way that they maintain an inside wall temperature which is a predetermined maximum value above the temperature of the circulating gas stream, and wherein the circulating gas stream is conveyed over at least one heat exchanger (2) which is connected to a second heat exchanger (16) located outside said receptacle by means of a closed cooling loop through which a flow medium can be circulated continuously, said second heat exchanger (16) being associated with a fan (18) which is controllable by a temperature regulator (A1).

2. An appliance as claimed in claim 1, which has a temperature controller (A1), which is controlled by a temperature sensor (R1) located in the circulating gas stream, and a humidity controller (A2) which is controlled by a humidity sensor (R2) located in the circulating gas stream.

3. An appliance as claimed in claim 2, wherein a pump (22) which can be controlled by the humidity controller (A2) is assigned to the spraying device (21).

4. An appliance as claimed in claim 1, wherein the wall-heating devices are designed as grid-shaped electrical heaters (6) which are integrated in the walls of the receptacle.

5. An appliance as claimed in claim 4, wherein the walls of the receptacle are constructed in a sandwich-like manner from an inner and an outer plate and a plastic foam layer located between these, the grid-shaped heaters (6) being in direct contact with the outer surface of the inner plates.

6. An appliance as claimed in claim 1, wherein a temperature sensor (R6,R5) is assigned respectively to the inside of the wall of the receptacle and to the circulating gas stream, and these control a differential controller (A4) which controls the operation of the wall-heating devices.

7. An appliance as claimed in claim 1, wherein a ventilator (18) which can be controlled by the temperature controller (A1) is assigned to the second heat exchanger (16).

8. An appliance as claimed in claim 1, wherein a temperature sensor (R4,R3) is assigned to the salt solution (5) and to the circulating gas stream, and these control a differential controller (A3) which controls the operation of the heating element (E1) located in the container.

9. An appliance as claimed in claim 1, wherein, when the conditioning device (10) is located on the ceiling (11) of the receptacle, the free cross-section of the perforated walls (7) is less at the bottom than at the top on the blowing-in side and less at the top than at the bottom on the blowing-out side.

* * * * *